United States Patent [19]

Steffinger

[11] Patent Number: 5,322,327
[45] Date of Patent: Jun. 21, 1994

[54] FRAME FOR AGRICULTURAL TRAILER VEHICLE

[76] Inventor: Konrad Steffinger, Zunham 4, 8201 Höslwang, Fed. Rep. of Germany

[21] Appl. No.: 936,753

[22] Filed: Aug. 27, 1992

[30] Foreign Application Priority Data

Aug. 29, 1991 [DE] Fed. Rep. of Germany ....... 4128730

[51] Int. Cl.$^5$ ............................................. B62D 21/04
[52] U.S. Cl. .................................... 280/786; 280/790; 280/797; 296/204
[58] Field of Search ............... 280/781, 786, 789, 790, 280/792, 795, 797, 79.6, 47.331, 414.1, 414.2; 296/181, 204, 205

[56] References Cited

U.S. PATENT DOCUMENTS

| | | | |
|---|---|---|---|
| 2,724,611 | 11/1955 | Robertson | 280/786 |
| 3,796,440 | 3/1974 | Shave | 280/786 |
| 4,093,253 | 6/1978 | Lehr | 296/204 |
| 4,221,395 | 9/1980 | Carte | 280/786 |
| 5,085,485 | 2/1992 | Wurl | 296/205 |

FOREIGN PATENT DOCUMENTS

| | | |
|---|---|---|
| 159150 | 7/1940 | Fed. Rep. of Germany . |
| 3818200 | 9/1989 | Fed. Rep. of Germany . |
| 1240387 | 7/1960 | France ................................. 280/789 |
| 0992295 | 2/1983 | U.S.S.R. ............................. 280/790 |
| 1134456 | 1/1985 | U.S.S.R. ............................. 280/781 |

OTHER PUBLICATIONS

Body Design, "Automotive Industries," Aug. 1, 1940.

Primary Examiner—Margaret A. Focarino
Assistant Examiner—Paul Dickson
Attorney, Agent, or Firm—Michael J. Striker

[57] ABSTRACT

A frame for an agricultural trailer vehicle has a single centrally extending longitudinal support having a hollow box-shaped construction. The longitudinal support has a width and a height which is greater than the width. The longitudinal support has a cross-section with a profile which changes over its length so that a maximum profile of its cross-section is provided in the region of a wheel axle.

11 Claims, 2 Drawing Sheets

FRAME FOR AGRICULTURAL TRAILER VEHICLE

BACKGROUND OF THE INVENTION

The present invention relates to a frame for an agricultural trailer vehicle.

Vehicle frames which are supported via the mountable wheels on the ground and carry units and devices corresponding to the objects of the vehicles are generally known. Usually two longitudinal supports are arranged at a transverse distance from one another and fixedly connected with a front and a rear transverse support to a rectangular frame. The horizontal orientation of this frame with the longitudinal supports and the transverse supports which are the same height and extend parallel to one another, leads to the fact that the frame over its whole length has a width corresponding to the length of the transverse support.

Such horizontal frames (width frames) have the difficulties in that the wheels are arranged laterally outside the longitudinal support, and the lateral wheel freedom is limited by the outer edges of the longitudinal support. In interest of a rational operation the trend for further increasing transport loads, so that the vehicle with high total weight runs on the agricultural fields. This requires however wider wheels in order to prevent the increase of ground pressure or the ground compacting over an average value. Suitable wide tires or wide wheels are also available, they are however not acceptable for a wide vehicle frame which must be maintained within permissible vehicle width to be used in open streets, as long as there is no special permission for this.

The German document DE 159 150 discloses a cross-country vehicle in which instead of a rectangular frame, an H-frame is disclosed with a single centrally extending longitudinal support of substantially square cross-section. It is formed U-shaped with an open upper side and crosses a front as well as rear transverse carrier extending between both wheels of the front or the rear wheel pair. The longitudinal support has in the region of the transverse carrier and thereby both wheel axes a substantially increased height, and the intersecting supports in the intersecting regions have a joint lower side. In both constructions the frames are small in their central region between both transverse supports. However, it deals with a horizontal frame (width frame) in which the front wheels as well as the rear wheels are arranged again at a distance corresponding to the length of the transverse support.

The German document DE-C 38 18 200 discloses an agricultural multi-purpose vehicle with a hollow profile frame. It has a single centrally extending longitudinal support of a square cross-section (maximum 50×50 cm), in which the rigid rear wheel axis and the swinging and pivotally formed front wheel axis are supported. For avoiding a high ground pressure it has wide wheels. The rear wheels have a diameter of more than 1.6 m and the width of from 1.0 to 1.3 m so that a wide rear wheel roller is formed, which is interrupted only by the longitudinal support. This multi-purpose vehicle is an automatic driver with a drive of both axes and with a driver cabin on the front region and the alternating attachments in the central and rear region of the vehicle frame. The longitudinal support has a square profile which remains the same over its whole length. In order to provide the required strength the profile of the longitudinal support must have a relatively great wall thickness and the average dimensions of the transverse cross-sectional profile must be maintained. The frame is therefore expensive and always has a width which poses an obstacle.

SUMMARY OF THE INVENTION

Accordingly, it is an object of the present invention to provide a frame for an agricultural trailer vehicle, which avoids the disadvantages of the prior art.

More particularly, it is an object of the present invention to provide a frame for an agricultural trailer vehicle which is designed so that especially wide wheels can be used without exceeding the permissible vehicle width and without interfering with the mounting of operationally required attachments, wherein at the same time a sufficient strength in connection with a relatively low material expenses is obtained.

In keeping with these objects and with others which will become apparent hereinafter, one feature of the present invention resides, briefly stated, in a frame which has a single centrally extending longitudinal support in a hollow box form, which has a greater height than a width and which is provided with a cross-sectional profile changing over its length, wherein the greatest cross-sectional profile is provided in the region of the wheel axle or each wheel axle.

The frame in accordance with the present invention in contrast to the known constructions, it not a horizontal frame but instead a vertical frame, since the longitudinal support which forms the frame is arranged vertically with its greater cross-section dimension and laterally a transverse support which is connected with the longitudinal support is dispensed with. This frame is usable for all agricultural trailer vehicles without limiting to special vehicle types.

Due to support cross-section which changes over the length of the longitudinal support, a length which is adjusted to the local loads is obtained. Therefore, the longitudinal support or frame can be produced with a sufficient strength and with relatively low material expenses and therefore can have a relatively lower weight.

Especially small structures having the longitudinal support with the width of for example of 15–20 cm there is a possibility to use especially wide wheels which reduce the ground pressure and at the same time have sufficient lateral freedom relative to the longitudinal support. In some cases, the transversely extending attachment support which is connected with the longitudinal support has a sufficient distance to the wheel axle or the wheel axles and it must not be arranged above the wheels. This contributes to a lower arrangement of the attachments and thereby increase a standing safety which is especially important for transportation load attachments.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
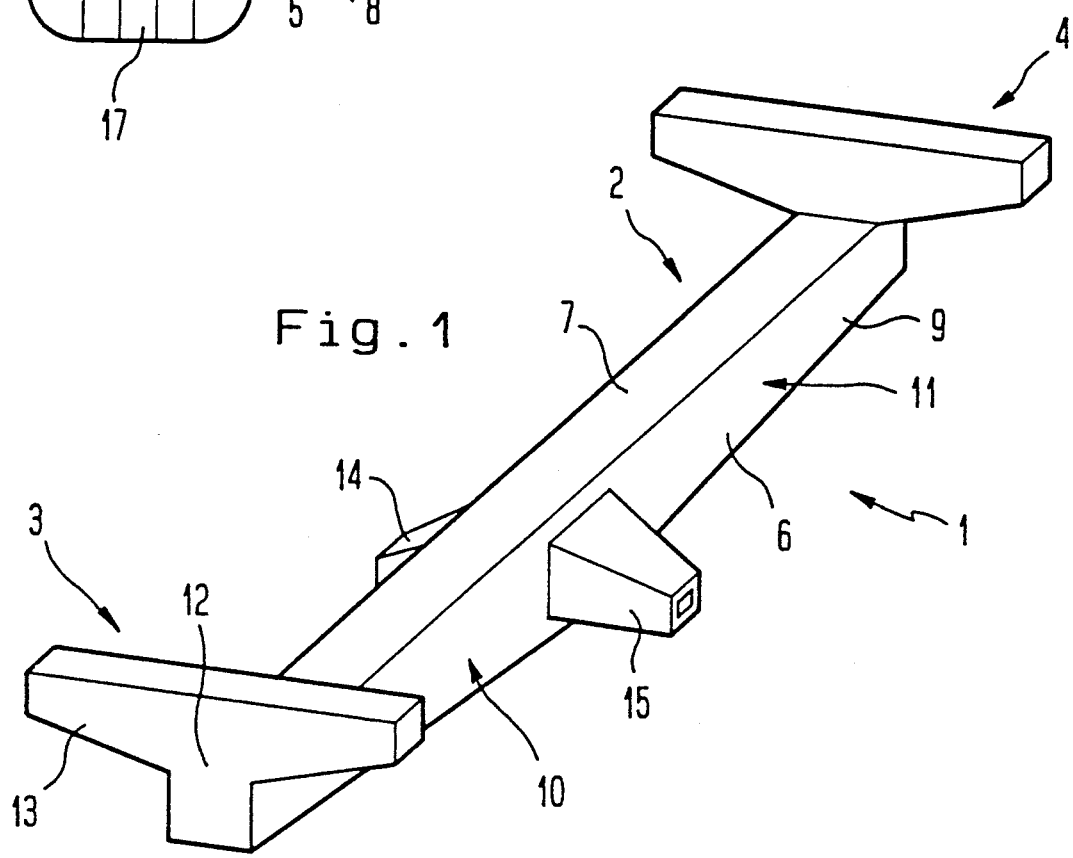
FIG. 1 is a perspective view of a vehicle frame in accordance with the present invention with a longitudinal support which carries an attachment support and an axle funnel.

A frame for an agricultural trailer vehicle shown in FIG. 1 is identified in whole with reference numeral 1. It has a longitudinal support 2 connected at its one end with a front attachment support 3 and at its another end with a rear attachment support 4. The longitudinal support 2 is formed as a hollow box with two parallel side walls 5 and 6, a flat upper wall 7, as well as with a front lower wall 8 and a rear lower wall 9. The front rear wall 8 and the rear lower wall 9 are inclined relative to the upper wall 7 in opposite directions. At the ends of the longitudinal support 2 they have the lowest distance from the upper wall 7.

In correspondence with this the longitudinal support 2 has a front longitudinal support cross-section 10 and a rear longitudinal support cross-section 11 which have a continuously changing rectangular cross-section with a height which is greater than a width. On the side view the longitudinal support 2 has substantially the shape of a flat triangle. Thereby in the central longitudinal region the frame 1 has the highest profile height and therefore the greatest strength. It is to be understood that the same results can be naturally achieved when the upper wall 7, contrary to the showing is subdivided into two roof-shaped, inclined portions. A corresponding strength pattern for the frame 1 can finally also be obtained by a (both sides) profile widening toward the frame center.

The attachment supports 3 and 4 have the same form as the longitudinal support 2. They extend above the longitudinal support and each are supported with their central region 12 on a respective end of the longitudinal support. They have two end portions 16 which extend oppositely to one another in a transverse direction and narrow outwardly. The end portions have a lower side inclined relative to the flat upper side.

Figure 2:
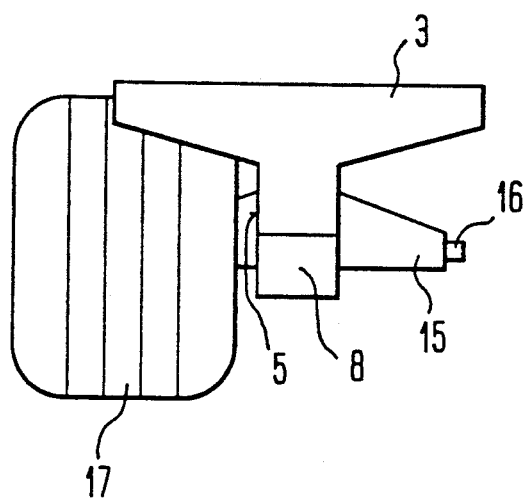
FIG. 2 is an end view of the frame shown in FIG. 1 with a wheel axle and a wide wheel.

Two axle funnels 14 and 15 are located opposite to one another at the opposite sides of the longitudinal support 2 and in its central region having the greatest height. The axle funnels 14 and 15 serve for mounting a wheel axle 16 for two wheels 17 provided with air tires, as shown in FIG. 2. The same is true when the frame 1 is a single axle frame.

The longitudinal support 2 and both attachments supports 3 and 4 are composed of metal sheets and welded with one another to form an assembly. The welding operations must be performed preferably only in the longitudinal direction.

Figure 3:
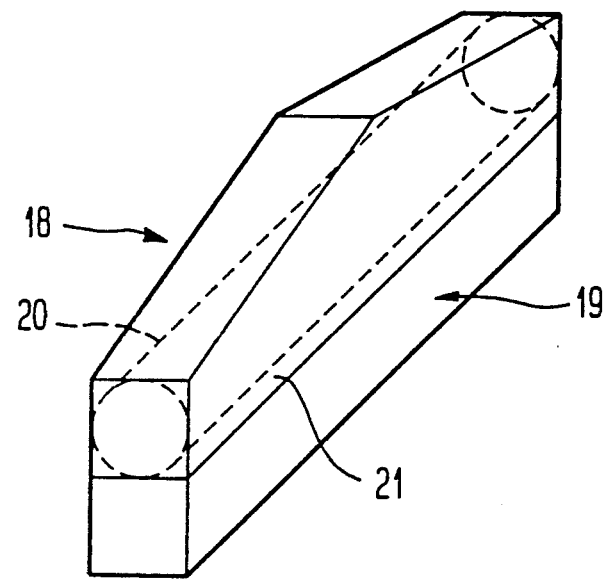
FIG. 3 is a perspective view of another embodiment of a longitudinal support of the inventive frame with an inner pipe.

FIG. 3 shows a frame in accordance with a further embodiment of the present invention. The frame is different from the frame of FIG. 1 and identified with reference numeral 18. It has a longitudinal support 19 composed of a round inner pipe 20 and a box-shaped outer pipe 21. The construction is reinforced by transverse webs or transverse walls which are not shown in the drawings and welded between the pipes 20 and 21. The frame 18 is also formed as a vertical small frame with a height which is greater than a width, and has a substantially triangular side view. However, here the lower side is flat while the upper side is roof shaped. Naturally the frame 18 can be also utilized with a reverse orientation.

In accordance with an alternative, not shown, embodiment a frame can be produced from two or more longitudinal pipes which are arranged over one another and connected with one another by welding.

Figure 4:
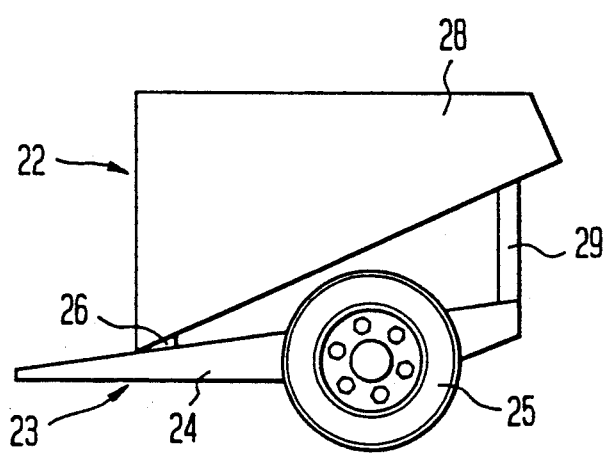
FIGS. 4 and 5 are a side view a rear view of a single-axle dropping-collecting truck with a corresponding frame.
Figure 5:
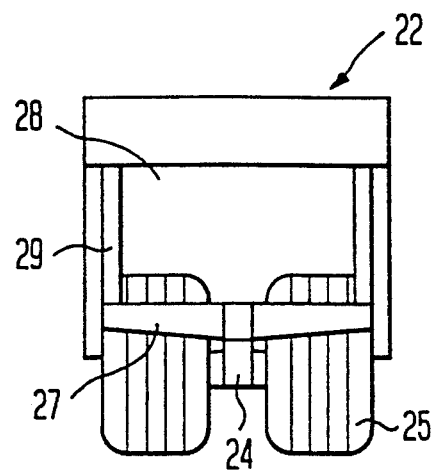

FIGS. 4 and 5 show a one-axle chopping/collecting truck 2 with a longitudinally extending small central frame 23. The frame 23 is formed by a box-shaped longitudinal support 24 and supported on the ground via two wide wheels 25. A front attachment support 26 and a rear attachment support 27 are connected with the frame 23 on its upper side and supports a collecting container 28, in particular its rear end via supports 29. The inclined bottom of the connecting container 28 extends substantially over the whole vehicle width and runs approximately tangentially at a small distance from both wheels 25.

Figures 6, 7:
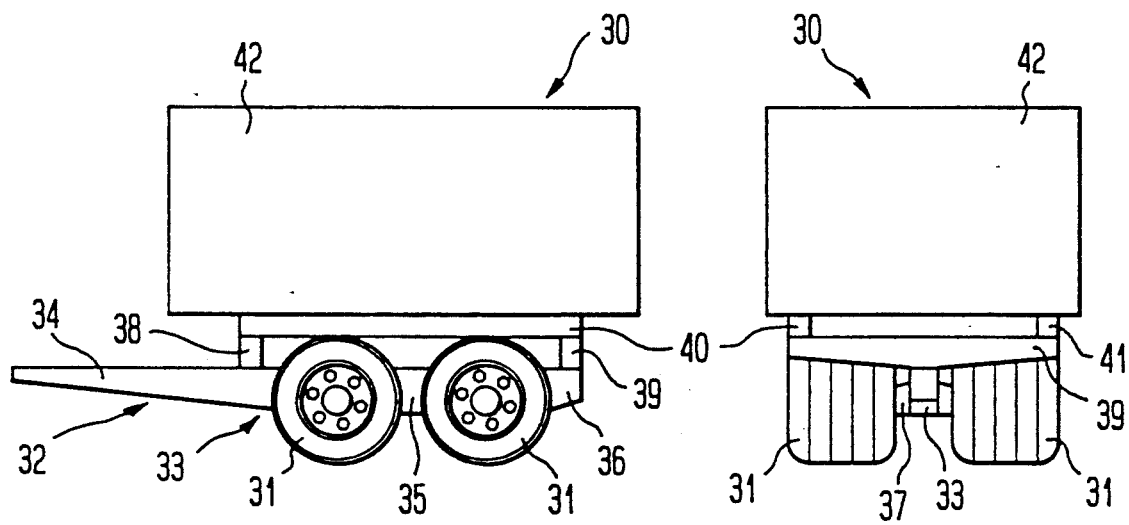
FIGS. 6 and 7 are a side view and a rear view of a two-axle transporting load truck with a corresponding frame.

The transportation load truck 30 shown in FIGS. 6 and 7 is formed as a two axle with four wide wheels 31. A small frame 32 extends between the wheel pair. It is formed as a longitudinal support 23 having a front portion 34, a central portion 35 and a rear portion 36. The central portion 35 of the longitudinal support 33 has a rectangular profile with a continuous height which exceeds its width. The portions 34 and 36 have a height which narrows toward the ends of the longitudinal profile. The both wheel axles or axle funnels 37 are arranged at the ends of the central portion 35 in the transition range to the portions 34 and 36, respectively. A front attachment support 38 and a rear attachment support 39 are fixedly connected with the upper part of the longitudinal support 33. Two supporting beams 40 and 41 are supported with their ends on the front attachment support 38 and the rear attachment support 39 and support the parallelpiped-shaped loading truck attachment 42. The horizontal bottom of the loading truck attachment 42 extends at a small distance above the wheels 31.

Figure 8:
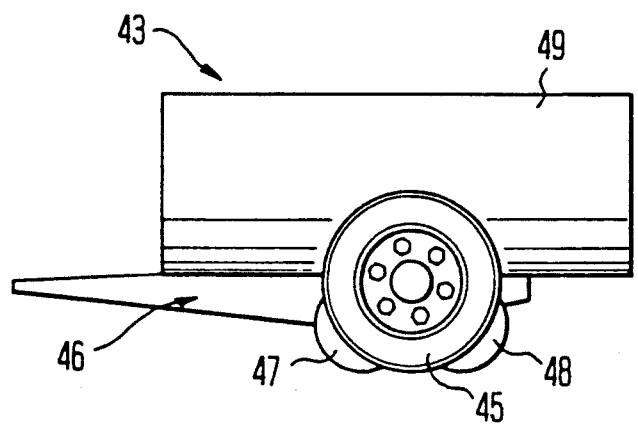
FIGS. 8 and 9 are a side view and a rear view of a manure tank truck with an outer wheel pair and two inner support wheel pairs, mounted on a corresponding frame.
Figure 9:
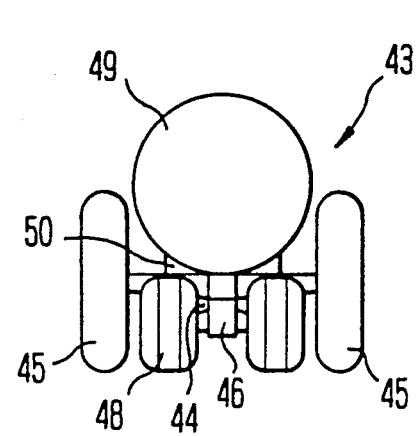

In the manure tank truck 43 shown in FIGS. 8 and 9 there is a frame combination with a conventional wide frame 44 with two small outer wheels 45 of a greater diameter and a box shaped longitudinally extending small frame 46 (longitudinal support) which supports two pairs of wider inner wheels 47 and 48 spaced from one another in a longitudinal direction. The longitudinally extending substantially horizontal manure tank 9 is supported on the small frame 46 and additionally via a supporting piece 50 also on the wide frame 44. Therefore, as can be seen, the smaller and wider inner wheels 47 and 48 are arranged underneath and the greater and smaller wheels 45 are arranged laterally near the manure tank 49.

Due to the great-volume tires and the relatively low traveling speed, special measures for spring biasing are not needed. A certain spring effect is obtained by the air tires in connection with the respective air pressure. In the combined construction shown in FIGS. 8 and 9 it is advantageous when the outer wheels 45 are inflated with a higher air pressure and the inner wheels 47 and 48 are inflated with a lower pressure.

It will be understood that each of the elements described above, or two or more together, may also find a useful application in other types of constructions differing from the types described above.

While the invention has been illustrated and described as embodied in a frame for an agricultural trailer vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A frame for an agricultural trailer vehicle, comprising a single centrally extending longitudinal support having a top wall, a bottom wall and side walls forming together a hollow closed box-shaped construction, said longitudinal support having a width and a height which is greater than said width, said longitudinal support having two opposite ends spaced from one another in direction of its elongation and a region of a single wheel axle located between said ends, said bottom wall of said longitudinal support being inclined downwardly from both said ends to the region of a single wheel axle so that a maximum profile of its cross-section is provided in the region of a single wheel axle between said ends and therefore a sufficient strength with a relatively low material consumption of the frame is provided.

2. A frame as defined in claim 1, wherein said longitudinal support has a flat upper wall, and also a front portion and a rear portion having lower sides which are inclined in a longitudinal direction of said upper wall and opposite to one another.

3. A frame as defined in claim 1, wherein said longitudinal support has a central portion provided with a continuous height which is greater than a height of remaining portions of said longitudinal support.

4. A frame as defined in claim 1; and further comprising axle funnels attached to said longitudinal support and extending in a transverse direction for mounting and supporting a wheel.

5. A frame as defined in claim 4, wherein each of said axle funnels has an end connected with said longitudinal support at the free end, each of said axle funnels narrowing toward said free end.

6. A frame as defined in claim 1, and further comprising a front attachment support and a rear attachment support associated with said longitudinal support, said attachment supports being arranged above said longitudinal support and supported on said longitudinal support.

7. A frame as defined in claim 6, wherein each of said attachment supports has a central portion connected with said longitudinal support and having a maximum height.

8. A frame as defined in claim 7, wherein said attachment supports have a flat upper side, said attachment supports having a central portion and two end portions located at both sides of said central portion, said end portions having a lower side which raises toward said upper side in a longitudinal direction of said attachment support.

9. A frame as defined in claim 1, wherein said longitudinal support includes a longitudinally extending inner pipe and a longitudinally extending outer pipe which surrounds said inner pipe.

10. A frame as defined in claim 9, wherein said inner pipe is formed as a round pipe.

11. A frame as defined in claim 1, wherein said longitudinal support is formed as a welded construction.

* * * * *